United States Patent [19]

Urciuoli

[11] 4,068,242

[45] Jan. 10, 1978

[54] RECORDER WITH LUBRICATED STYLUS

[75] Inventor: John P. Urciuoli, Providence, R.I.

[73] Assignee: Raytheon Company, Lexington, Mass.

[21] Appl. No.: 756,671

[22] Filed: Jan. 4, 1977

[51] Int. Cl.² .......................................... G01D 15/16
[52] U.S. Cl. .............................................. 346/139 A
[58] Field of Search ....................... 346/139 A, 139 C

[56] References Cited

U.S. PATENT DOCUMENTS

| 3,683,412 | 8/1972 | Priessnetz | 346/139 A |
| 3,757,352 | 9/1973 | Murray et al. | 346/139 A UX |
| 3,787,889 | 1/1974 | Shaler et al. | 346/139 A |

Primary Examiner—George H. Miller, Jr.
Attorney, Agent, or Firm—David M. Warren; Joseph D. Pannone; Milton D. Bartlett

[57] ABSTRACT

A recorder in which a stylus is transported in successive line scans across a recording medium for imprinting data thereon, a stylus transport having a guide edge with which the stylus makes sliding contact, the stylus transport having a lubricating surface against which the stylus is guided for producing a thin film of lubricant upon the stylus. The lubricating film prevents wear between the stylus and the guide.

2 Claims, 5 Drawing Figures

RECORDER WITH LUBRICATED STYLUS

BACKGROUND OF THE INVENTION

Line scan recorders, such as those utilized, for example, in sonar systems for providing a pictorial representation of the ocean bottom, frequently incorporate a stylus transport wherein a stylus is moved along a recording medium and in sliding contact with a guide which insures the travel of the stylus along a straight line. More recently, such recorders are being manufactured with stylus transport mechanisms which move the styli at ever increasing speeds so that the recorder is useful, not only in sonar applications, but also, for example, in biomedical applications and for signal spectrum analysis. A problem has arisen with the increased styli speeds, namely, that the higher speed sliding contact between stylus and guide produces a sufficiently high rate of wear of the stylus and/or the guide which necessitates the shutdown of the recorder for replacement of the worn parts.

SUMMARY OF THE INVENTION

The aforementioned problem is overcome and other advantages are provided by a recorder which, in accordance with the invention, comprises a stylus transport having a lubricating surface against which the stylus is guided for producing a film of lubricant upon the stylus, the film of lubricant being sufficiently thin to permit the conduction of electrical signals between a guide of the stylus transport and the stylus while providing sufficient lubricity between the stylus and the guide to inhibit wear.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
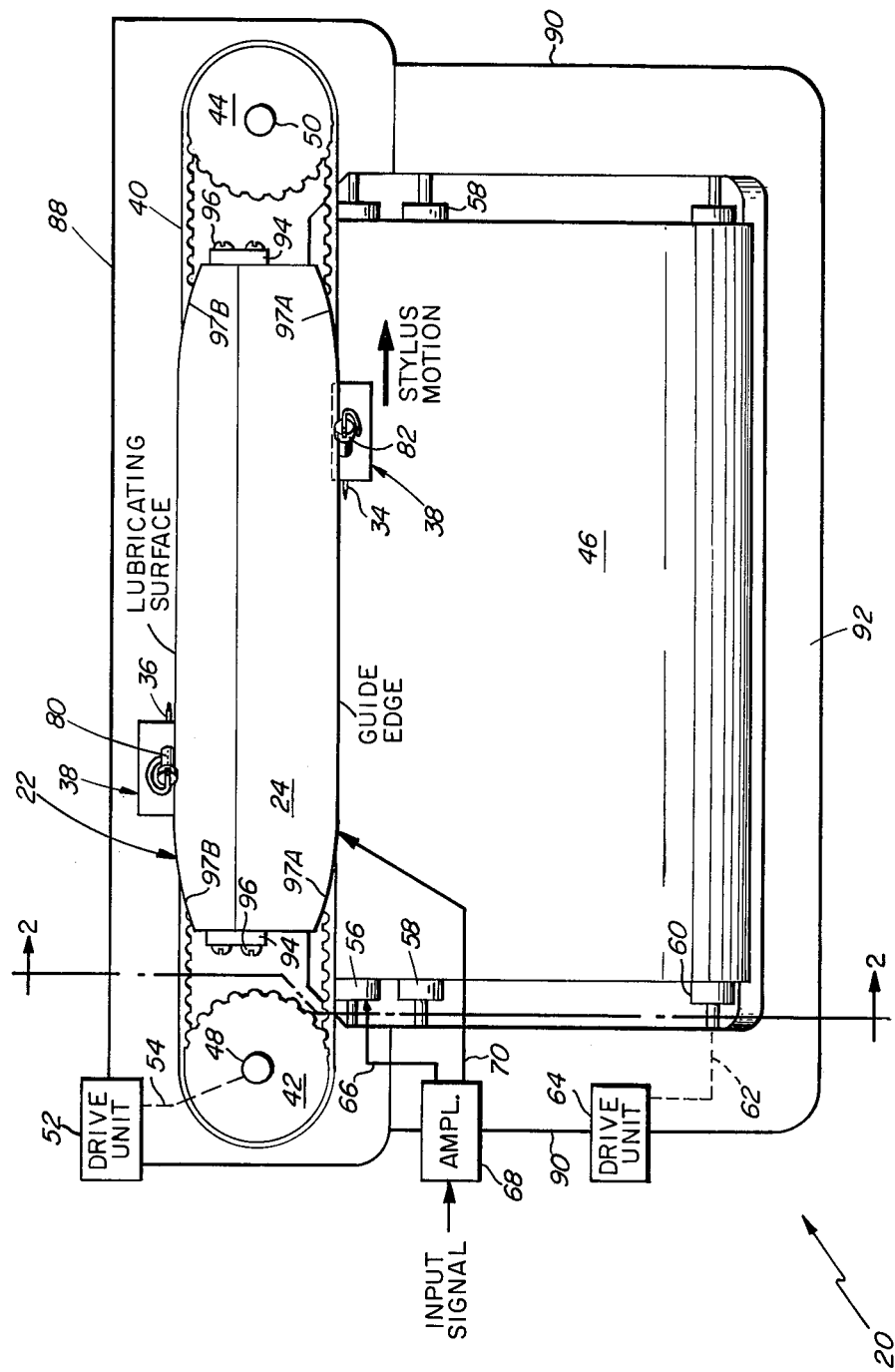
FIG. 1 is a plan view of a line scan recorder having a stylus transport which includes a lubricating surface in accordance with the invention.
Figure 2:
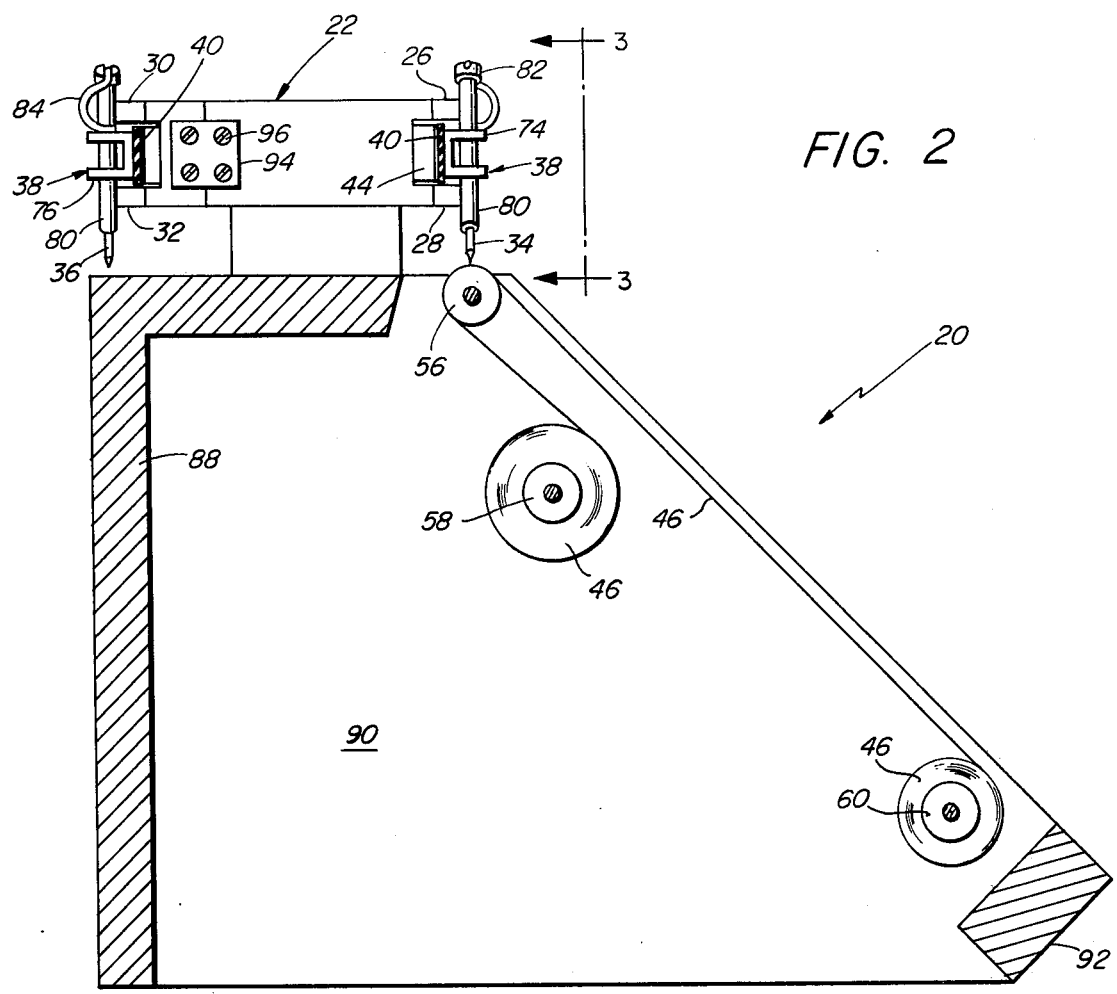
FIG. 2 is a side view of the recorder of FIG. 1 taken along the line 2—2 of FIG. 1.
Figure 3:
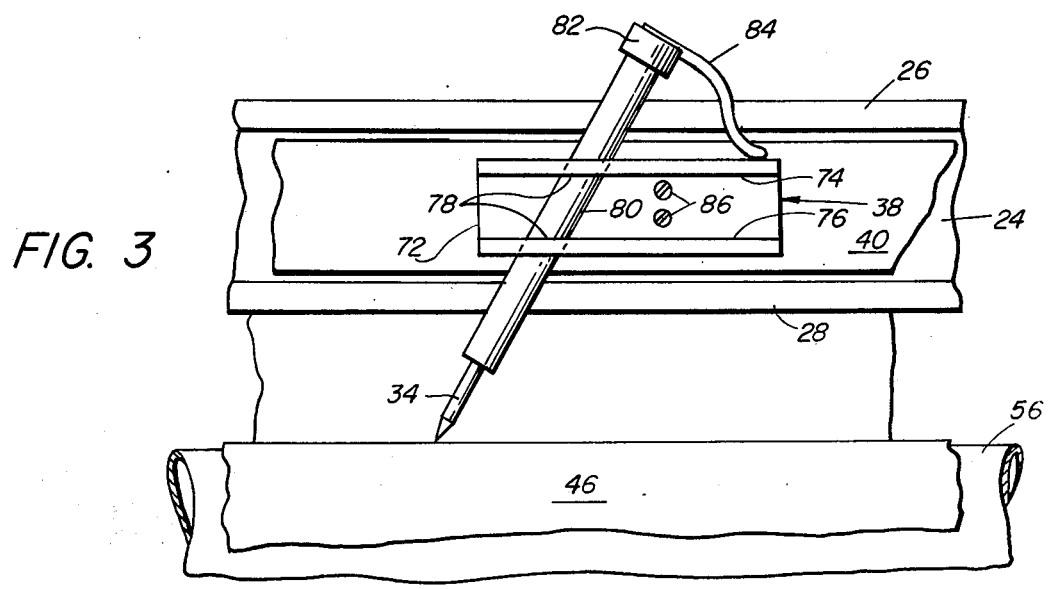
FIG. 3 is an elevation view of a portion of the front of the stylus transport taken along the line 3—3 of FIG. 2.

Referring now to FIGS. 1, 2 and 3, a line scan recorder 20 incorporates a stylus transport 22 having a guide assembly 24 including upper and lower guides 26 and 28 along a front section thereof and, in accordance with the invention, upper and lower lubricating surfaces 30 and 32 along a back section of the guide assembly 24. Two styli 34 and 36 are carried within holders 38 and affixed to a belt 40 having teeth for meshing with sprocket drive wheels 42 and 44, rotation of the wheels 42 and 44 imparting a longitudinal motion to the belt 40 for transporting the styli 34 and 36 successively across a paper 46 which serves as the recording medium. The wheels 42 and 44 are rotated about shafts 48 and 50 of the stylus transport 22, the stylus transport 22 further including a drive unit 52 which is shown diagrammatically and is mechanically coupled via line 54 to the shaft 48 for imparting rotation to the wheel 42.

The paper 46 is supported by three rollers 56, 58 and 60, the latter being mechanically connected via line 62 to a drive unit 64 which imparts rotation thereto for winding up the paper 46 and for pulling the paper 46 beneath the lower guide 28 of the guide assembly 24. The roller 58 serves as a supply of the paper 46 and includes a brake (not shown) for maintaining tension within the paper 46. Further description of means for positioning a recording medium such as that of the paper 46, as well as a stylus transport similar to the stylus transport 22 as provided in a copending patent application by J. P. Urciuoli and R. P. Icart entitled "Recorder with Edge-Guided Belt" filed on Nov. 25, 1975 and having Ser. No. 635,207. The roller 56 is made of an electrically conducting metal and is coupled via line 66 to one output terminal of an amplifier 68, a second output terminal of the amplifier 68 being coupled via line 70 to the upper guide 26. Input electrical signals to be recorded on the paper 46 are amplified by the amplifier 68 to a suitable amplitude for inscribing marks on the paper 46, the paper 46 being partially conductive of electrical signals and having a surface which is discolored or burnt in accordance with the amplitude of such signals. Input electrical signals from the amplifier 68 are coupled via the line 70 through the upper guide 26 to the holder 38 and then via the stylus 34 through the paper 46 to the roller 56 to complete the electrical circuit via line 66 to the amplifier 68. The roller 56 is positioned directly beneath the path of travel of the stylus 34 and is freely rotatable to permit successive strips of the paper 46 to be sequentially positioned beneath the path of the stylus 34.

Each of the holders 38 supporting the styli 34 and 36 are identical, a holder 38 comprising a U-shaped metallic flange 72 having upper and lower sides 74 and 76 with apertures 78 therein. An elongated metallic cylinder 80 is secured within the apertures 78, the apertures 78 being positioned for tilting the cylinder 80 forwardly in the direction of travel of the holder 38. The stylus 34 is slidably secured within the cylinder 80 and in electrical contact therewith. A slotted cap 82 is secured at the upper end of the stylus 34. A spring 84 secured to the upper side 74 of the holder 38 has its end nested within the slot of the cap 82 for urging the stylus 34 downwardly through the cylinder 80 for contacting the paper 46 with a uniform amount of force as the stylus 34 travels along the paper 46. Two bolts 86 secure the holder 38 to the belt 40. Tension in the belt 40 maintains the upper and the lower portions of the cylinder 80 in contact with the upper and lower guides 26 and 28 of the guide assembly 24 to provide a path of electrical conductivity between the guide assembly 24 and the cylinder 80. In addition, the constant contact between the cylinder 80, and the guides 26 and 28 insures that the stylus 34 travels along a straight path during each of its consecutive passes across the paper 46. The stylus 36 is seen in its fully extended position wherein the cap 82 contacts the upper end of the cylinder 80, the tip of the stylus 36 being seen to pass above a rear wall 88 which supports the guide assembly 24.

The recorder 20 includes a housing for supporting the stylus transport 22 as well as the three rollers 56, 58 and 60, the housing including the aforementioned rear wall 88 as well as side walls 90 and a front member 92. The rollers 56, 58 and 60 are supported by the side walls 90 while the stylus transport 22 is supported by both the rear wall 88 and the side walls 90.

In accordance with the invention, the guide assembly 24 comprises a front section having the aforementioned guides 26 and 28 and a rear section having the aforementioned lubricating surfaces 30 and 32, the two sections being joined by plates 94 and screws 96. The front section is constructed of an electrically conducting metal to provide the aforementioned electrical conductivity between the guide assembly and the stylus holder 38. The rear section is composed of a sintered bronze block, the pores of which are filled with a lubricating oil which provides permanent lubrication to the upper and the lower lubricating surfaces 30 and 32. A thin film of the oil is maintained on each of the cylinders 80 by the periodic contact with the upper and the lower lubricating surfaces 30 and 32. The end portions 97A of the guides 26 and 28 as well as the end portions 97B of the lubricating surfaces 30 and 32 are curved inwardly to facilitate the contacting of the stylus holders 38 therewith as the stylus holders 38 are carried by the belt 40 from positions adjacent the wheels 42 and 44 to positions of abutment with the guide assembly 24. The tension of the belt 40 secures the holders 38 in contact with the lubricating surfaces 30 and 32 as the holders 38 are carried along the surfaces 30 and 32.

Figure 4:
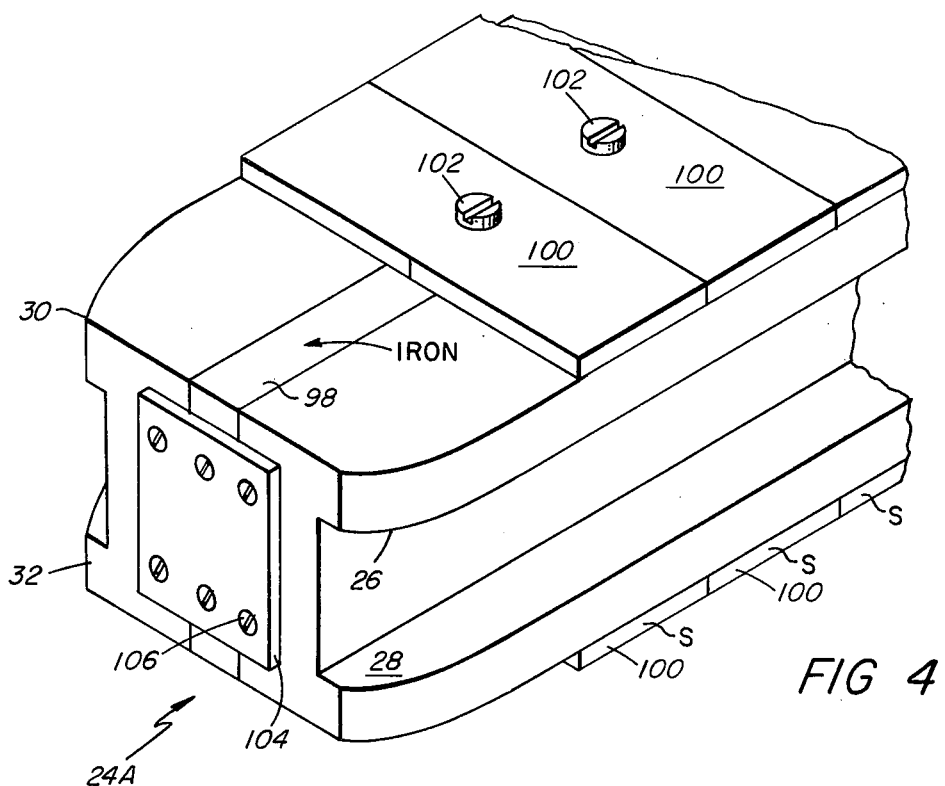
FIG. 4 is an isometric view of a portion of a modified stylus transport incorporating a magnetized structure for magnetically urging a stylus against an edge of the guide.

Referring now to FIG. 4, there is seen an alternative embodiment of the guide assembly, this embodiment being identified by the legend 24A. The guide assembly 24A has three sections, a front section having the guides 26 and 28 as was disclosed above for the front section of the guide assembly 24 of FIGS. 1-3, a back section of sintered bronze and having the lubricating surfaces 30 and 32 as was disclosed above for the back section of the guide assembly 24 of FIGS. 1-3, and a middle section 98 of a magnetic material such as iron. Permanently magnetized plates 100 are bolted by bolts 102 to the section 98 with the north poles of the plates 100 contacting the upper guide 26 while the south poles of other plates 100 contact the lower guide 28. The cylinders 80 of the stylus holders 38 of FIGS. 1-3 are formed of a magnetic metal such as iron or an alloy thereof whereby the composite structure of the plates 100 and the section 98 provide U-shaped magnets which attract the cylinders 80 towards the guides 26 and 28 and the lubricating surfaces 30 and 32. Plates 104 and screws 106 secure the front section and the back section to the middle section 98 of the guide assembly 24A. The use of the magnetic structure of the plates 100 and section 98 provides for a more uniform stylus pressure against the guides 26 and 28 and against the lubricating surfaces 30 and 32 than the pressure provided by the tension of the belt 40 of FIGS. 1-3 which may vary due to vibrations in the belt 40.

Figure 5:
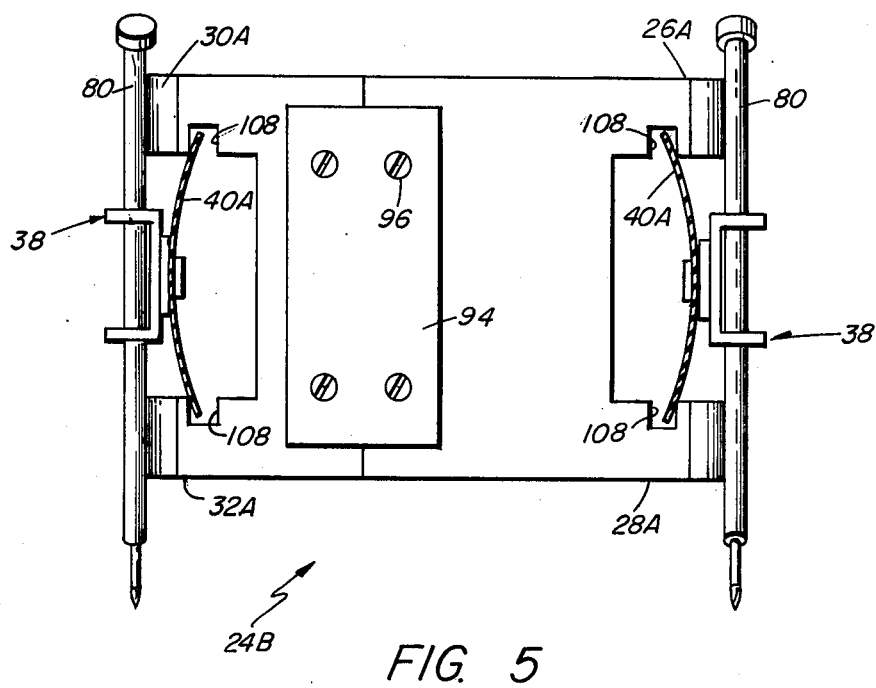
FIG. 5 is an end view of an alternate guide assembly of the stylus transport wherein the edges of a belt carrying a stylus are urged inwardly by channels positioned interiorly of the guide edges.

Referring now to FIG. 5, there is seen yet another embodiment of the guide assembly 24 of FIGS. 1-3, the embodiment of FIG. 5 being identified by the legend 24B. The guide assembly 24B comprises two sections, a front section and back section, as does the guide assembly 24 of FIGS. 1-3. However, the guide assembly 24B differs from the guide assembly 24 in that the upper and lower guides, here identified by the legends 26A and 28A, and the upper and lower lubricating surfaces, there identified by the legends 30A and 32A, are provided with channels 108 which overlap the edges of the belt, here identified by the legend 40A. The structure of this guide assembly and its relationship to the belt is the same as that disclosed in the aforementioned patent application of Urciuoli and Icart. The rear section of the stylus guide 24B is constructed of the sintered bronze in the same manner as disclosed previously for the guide assembly 24 of FIGS. 1-3. The channels 108 cause an inward bowing of the upper and lower edges of the belt 40A thereby urging the stylus holders 38 inwardly to insure contact of the cylinders 80 against the guides 26A and 28A and against the lubricating surfaces 30A and 32A. The belt 40A is constructed of a smooth inextensible material having a natural lubricity with the metal of the guide assembly 24B to provide smooth uniform contact of the styli 80 with the guide assembly 24B. The end portions of the guides 26A and 28A as well as the end portions of the lubricating surfaces 30A and 32A are curved inwardly to facilitate the initiation of contact between the styli 80 and the guides 26A and 28A and the lubricating surfaces 30A and 32A.

It is understood that the above described embodiments of the invention are illustrative only and that modifications thereof may occur to those skilled in the art. Accordingly, it is desired that this invention is not to be limited to the embodiments disclosed herein but is to be limited only as defined by the appended claims.

What is claimed is:

1. A recorder comprising:
   a recording medium and a stylus assembly;
   a stylus transport for transporting said stylus assembly along said recording medium and in contact therewith, said transport including a guide and means for slidably securing said stylus assembly to said guide for urging said stylus assembly along a predetermined path of travel;
   lubricating means coupled to said transport for providing lubricity between said stylus transport and said guide, said lubricating means including means for contacting said stylus assembly during a movement thereof, said lubricating means comprising a block of rigid porous material containing a lubricant in the pores thereof, said stylus assembly contacting said porous material, said stylus transport including means for urging said stylus assembly against said porous material; and wherein
   said lubricant forms a film on a portion of said stylus assembly, said film being sufficiently thin to permit the conduction of electrical signals therethrough between said guide and said stylus assembly.

2. A recorder comprising:
   a recording medium and a stylus assembly;
   a stylus transport for transporting said stylus assembly along said recording medium and in contact therewith, said transport including a guide and means for slidably securing said stylus assembly to said guide for urging said stylus assembly along a predetermined path of travel, said stylus assembly producing a mark upon said recording medium in response to an electrical signal coupled to said stylus assembly from said guide; and
   lubricating means coupled to said transport for providing lubricity between said transport and said guide, said lubricating means comprising a block of material having pores therein for containing a lubricant, said transport guiding said stylus assembly along said lubricating block to produce a film of lubricant on a portion of said stylus assembly, said film being sufficiently thin to permit the conduction of said electrical signal therethrough between said guide and said stylus assembly.

* * * * *